United States Patent [19]
Lipper et al.

[11] Patent Number: 5,429,418
[45] Date of Patent: Jul. 4, 1995

[54] CHILD SAFETY RESTRAINT SYSTEM AND METHOD THEREFORE

[75] Inventors: Carol A. Lipper, 2270 Ash St., Denver, Colo. 80207; Russell Simpson, Denver; Mark Joseph, Aspen, both of Colo.

[73] Assignee: Carol A. Lipper, Denver, Colo.

[21] Appl. No.: 32,669

[22] Filed: Mar. 17, 1993

[51] Int. Cl.⁶ ............................................. B60R 21/00
[52] U.S. Cl. ..................................... 297/465; 297/483
[58] Field of Search ............... 297/465, 468, 464, 484, 297/485, 486, 483; 280/801, 808, 803, 806

[56] References Cited

U.S. PATENT DOCUMENTS

| | | | |
|---|---|---|---|
| 2,252,357 | 8/1941 | Shaw | 297/465 |
| 2,908,324 | 10/1959 | Muller et al. | 297/465 |
| 3,834,758 | 9/1974 | Soule | 297/389 |
| 4,016,245 | 5/1977 | Arthur | 119/96 |
| 4,848,793 | 7/1989 | Haspen et al. | 297/465 X |
| 4,911,105 | 3/1990 | Hocum | 119/96 |
| 4,951,965 | 8/1990 | Brown | 280/801 |
| 5,063,879 | 11/1991 | Vorbau | 119/96 |
| 5,074,588 | 12/1991 | Huspen | 280/801 |
| 5,161,258 | 11/1992 | Coltrain | 297/465 X |
| 5,213,366 | 5/1993 | Sweger, Jr. | 297/465 X |

OTHER PUBLICATIONS

One Step Ahead Catalog, Lake Bluff, Ill., Item J, UltraSafe Car Restraint, Dec. 1992.
One Step Ahead Catalog, Lake Bluff, Ill., Item M. Safe Fit Dec. 1992.

*Primary Examiner*—Laurie K. Cranmer
*Attorney, Agent, or Firm*—Glenn L. Webb

[57] ABSTRACT

A safety restraint system having a body component including a head opening for insertion over the head of a child and a belt which buckles around the lower rib cage of the child to secure the safety restraint system on the child. The safety restraint system can thus be secured to the child prior to the child entering the vehicle. A first strap member is secured to a lower portion of the body component. This first strap is wrapped over a vehicle lap belt until an engaging member having fabric hook elements engages fabric loop elements on a receiving member affixed to the body component.

A second strap is affixed to the body component just below the head opening. This strap is folded downward over the vehicle shoulder belt until fabric hook elements engage fabric loop elements on the reverse side of the engaging member on the first strap. The second strap positions the shoulder belt away from the head and neck of the child. This provides a safer restraint as well as a more comfortable situation for the child.

21 Claims, 2 Drawing Sheets

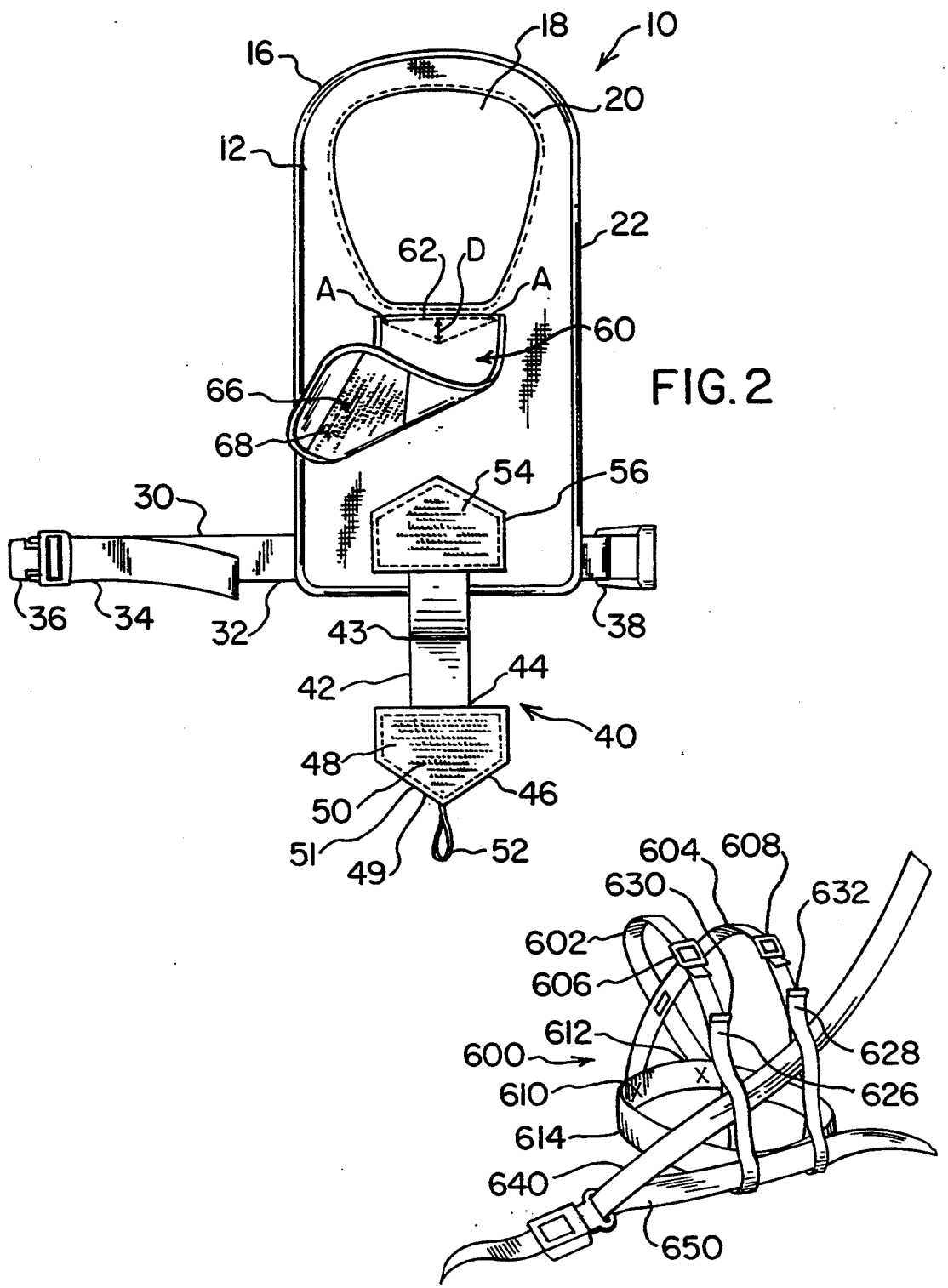

CHILD SAFETY RESTRAINT SYSTEM AND METHOD THEREFORE

BACKGROUND OF THE INVENTION

1. Field of the Invention

This invention relates to the field of safety restraints for children and particularly to the field of safety restraint systems for use in vehicles such as automobiles.

2. Statement of the Problem

Presently available vehicular safety restraint systems, such as shoulder/lap belt systems, are installed by the manufacturer in most modern vehicles. These safety restraints, while normally effective for their intended purposes with adult-sized passengers, are often ineffective with children. However, children are under the greatest risk of injury in the case of automobile collisions due to their size and weight. Thus, infant car seats are provided to protect infants and small children. These infant car seats are required under many state laws for children under a certain age and/or weight category. These seats are normally certified for use only for children under certain ages and weights. Typically these limits are for children under the age of four years and under forty pounds.

Children over these limits, for whom infant seats are no longer suitable, may still have problems using the manufacturer-installed safety restraints. These systems, while possessing some degree of adjustability, do not adequately fit most children until the children are a certain minimum size. Typically, this limit is about sixty to eighty pounds, which for most children is about age nine years. The ninety-fifth percentile median weight and size for nine year children is about eighty-eight pounds and fifty-six inches. The shoulder straps of the manufacturer-installed safety restraints tend to ride across the face and neck of children below this size. This increases the likelihood of injury to the neck and spine of the children. More importantly, children on whom such restraints are used tend to move the shoulder strap behind them or under their arm and across their chest, thus reducing the effectiveness of these restraint systems. Additionally, the width of the spacing of the lap belt is intended for larger bodies. These two factors combine so that the child is easily catapulted out of the restraints in the event of collisions, crashes, rapid deceleration or other similar situations. Thus, children who have outgrown infant car seats but on whom the manufacturer-installed restraints are not effective are in particular danger during automobile crashes or rapid deceleration.

There is often a lack of compliance with the manufacturer-installed restraint systems by children between the ages of three and nine years. Children in this age group are prone to fidget and to wriggle out of the safety belts, particularly the shoulder straps. This requires constant attention to ensure compliance, which in itself may increase the likelihood of accidents since attention is often diverted from the driving of the vehicle.

Several systems are presently marketed which attempt to address these problems. These tend to fall within several categorical types. The first type is simply a booster seat to ensure so that the shoulder strap is in a more appropriate position. These booster seats are bulky and must be stored and/or transported between vehicles. Also, these booster seats reduce the effectiveness of the overall restraint system since the booster seat is normally not secured to the vehicle. Additionally, children beyond the age required to be infant seats usually do not want to be in a "car seat".

A second type of restraint system is intended to direct the shoulder strap away from the head of the child. For instance one system, sold under the trade name "SAFE-FIT", is widely marketed. This system is a padded sleeve through which a vehicle shoulder belt is passed. The sleeve is intended to keep the shoulder strap off the child's neck and face. However this system is not adjustable and is useful only on children within a limited range of sizes. Additionally, this system is secured in such a manner that the lap belt may be lifted to the waist and increases the risk of abdominal injury.

A third type of restraint system is a bulky restraint which is secured to existing manufacturer-installed restraint systems. One such commercially marketed system is the "AUTO SAFETY VEST" sold through the catalog of One Step Ahead, Lake Bluff, Ill. This system is similar to a life preserver vest in which the rear of the vest buckles to a seat belt. This system is designed for children in the upper weight limit still in infant car seats, typically within twenty to forty-five pounds. This system tends to be uncomfortable thus creating a problem with compliance.

Another problem with the above-described systems and other available restraint systems is the ease of release in the case of an emergency. A restraint device must easily release the child should an emergency arise, such as in the aftermath of a vehicle collision. The known prior systems are difficult to release in such situations.

Many of the prior safety restraints are either bulky or difficult to remove once mounted. This limits the availability of use of these devices since a child may be transported in a variety of vehicles. For instance, children are often transported to school or day care via car pools, vans or buses. This would require a plurality of safety restraints for each vehicle if the safety restraint is not compact and easy to use.

Another problem arises due to the lack of shoulder belts. Many older vehicles, airline passenger seats, school bus seats as well as some seating positions in new model automobiles are equipped only with lap belts. It is difficult or impractical to retrofit such vehicles with currently available child restraint systems. However, the lack of such restraints are especially dangerous to children due to the susceptibility of injury to children in accidents or rapid deceleration. Many of the prior child safety restraints are not usable without shoulder straps.

Presently there is no safety restraint system that comfortably and effectively provides protection for a range of sizes of small children in the event of a vehicular accident or rapid deceleration.

SUMMARY OF THE INVENTION

The present invention provides a vehicular safety restraint system for use with small children that solves these and other problems. For purposes of this invention, small children are considered to be children within about thirty pounds to about ninety pounds and between about thirty-six inches and fifty-six inches tall. The safety restraint system of the present invention provides a restraint system that effectively protects small children who have outgrown infant car seats and legally mandated booster seats from injury in the incident of a vehicular accident or rapid deceleration. This safety restraint system is not only effective in protecting a child using this system, but is also easy to use and comfortable and therefore promotes compliance with the use of the system. An additional important feature is the ability to quickly release the child from the system if necessary.

In one preferred embodiment of the present invention, the safety restraint system includes a body member formed of a comfortable and washable material. The upper portion of this body member includes a head opening for insertion over the head of a child. The lower portion includes thin padding to create a formed body shape on the body member to enhance the comfort of the safety restraint system. The body member can be formed of colorful materials and/or with designs on the anterior face.

A belt is attached to a lower end of the body member which buckles around the lower rib cage of the child to secure the safety restraint system on the child. This belt can be easily adjusted for differing sizes of children or bulky clothing worn by an individual child. The safety restraint system can thus be secured to the child prior to the child entering the vehicle.

A first strap member is secured to a lower portion of the body member. This first strap includes an engaging member having fabric hook elements, such as Velcro. The first strap is folded upwards for the engaging members to engage on fabric loop elements on a receiving member affixed to the body member. This creates a loop for the lap belt of a manufacturer-installed vehicular restraint system. The first strap is folded over the lap belt during the engaging process.

A second strap is affixed to the body member just below the head opening. This strap is folded downward over the shoulder belt of the manufacturer-installed vehicular restraint system. Fabric hook elements of the second strap engage fabric loop elements on the reverse side of the engaging member on the first strap. The second strap positions the shoulder belt away from the head and neck of the child. This provides a safer restraint as well as a more comfortable situation for the child.

The child is thus securely restrained in the vehicle. This restraint system is comfortable for the child so that the child will comply with the use of the system. The child can be easily removed from the vehicle by pulling the second strap upward to disengage the fabric hook and loop elements. The first strap can then be pulled downward to disengage the fabric hook and loop elements of the first strap. The lap belt and shoulder belt can then be released to allow the child to leave the vehicle. This can be done very quickly in an emergency situation. Additionally, the restraint system of the present invention is compact and can be easily stored in a purse or even in a child's knapsack to be usable in a variety of vehicles.

These and other features will be evident from the ensuing detailed description of a preferred embodiment and from the drawings.

BRIEF DESCRIPTION OF THE DRAWINGS

FIG. 2 is a front view of the safety restraint system of the FIG. 1.

FIG. 6 is a perspective view of a second embodiment of the safety restraint of present invention.

DETAILED DESCRIPTION OF A PREFERRED EMBODIMENT

The present invention provides a safety restraint system for use in vehicles to protect small children in the event of an accident or deceleration. For purposes of this invention, small children are considered to be children within a range of about thirty pounds to about ninety pounds and between about thirty-six inches and about fifty-six inches tall. This system provides effective restraint as well as promoting compliance of use with small children. Promoting compliance is extremely necessary as no safety restraint system can be effective if not used.

One preferred embodiment of the safety restraint system of the present invention is illustrated in FIGS. 1–5. It is to be expressly understood that this descriptive embodiment is intended for explanatory purposes only and is not meant to limit the scope of the inventive concept. Other embodiments and alternatives, both as discussed herein as well as others, are considered to be within the claimed invention.

Figure 1:
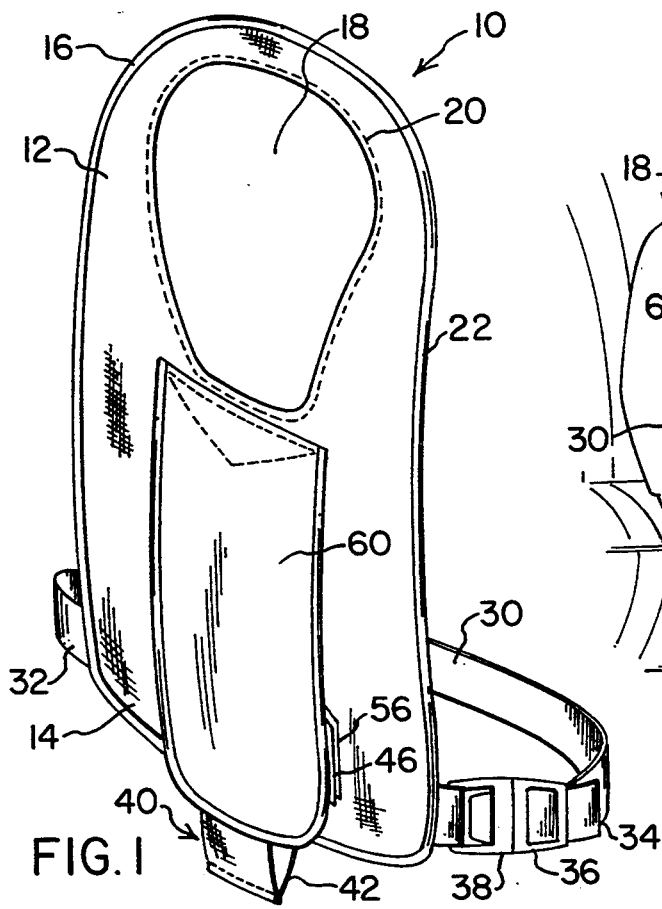
FIG. 1 is a perspective view of a preferred embodiment of the safety restraint system of the present invention.

Safety restraint system 10, as shown in FIG. 1, includes body component 12. Body component 12 includes lower portion 14 and upper portion 16. Upper portion 16 includes interior hole 18 having a substantially oval shape to receive the head and neck of a child. Stitching 20 adjacent hole 18 is provided for reinforcement and to prevent tearing of body component 12. Hem 22 is provided around the exterior of body component 12 to provide additional strength.

Body component 12 is formed of two layers of fabric, such as nylon, or any other material that is lightweight, high strength, durable, and easy to clean. Lower portion 14 includes a thin layer of foam padding between the two fabric layers to add body and shape to this portion of safety restraint system 10.

Belt 30 is secured at belt end portion 32 to body component 12. End 34 of belt 30 has buckle 36 secured thereto. Mating buckle member 38 is secured to body component 12. Safety restraint system 10 can thus be secured around the body of a child by belt 30. Buckles 36, 38 are of well-known design and allow for ease of use as well as adjustability. Other securing devices could be used, such as Velcro-type fasteners and other fasteners known in the field.

Safety restraint system 10 includes cooperative securing straps 40, 60 to secure the shoulder belts and lap belts of vehicle manufacturer-installed safety restraint systems to the safety restraint system. Lap belt securing strap 40, shown in FIG. 2, includes strap member 42 secured onto the lower end of lower portion 14 of body component 12. Strap member 42 is formed from one-one/half inch nylon webbing. Other types and sizes of straps can also be utilized. Double-sided engaging member 46 is secured onto free end 44 of strap member 42. Fabric hook elements 50, such as Velcro or other similar products, are formed on side 48 of engaging member 46. Fabric loop elements 51 are formed on side 49 of engaging member 46. In the preferred embodiment, engaging member 46 is substantially larger than strap member 42 to provide a larger securing area. Loop 52 is secured on the end of engaging member 46.

It is to be expressly understood that other types of securing devices can be utilized within the scope of this invention. For instance, snaps, buttons, buckles, zippers, and other securing devices known in the field can be used for this securing assembly as well as the other securing assemblies in this invention.

Fabric loop elements 54 are formed on receiving member 56 on body component 12. Fabric loop elements 54 engage fabric hook elements 50 to form a secure engagement between engaging member 46 and receiving member 56. Strap member 42 includes double-stitching 43 on strap member 42 to form a loop for passage of the vehicle lap belt to secure the tap belt to safety restraint system 10.

Securing strap 60 is formed from two layers of high strength material such as nylon. A stiffener can be provided between the two layers to provide form and body to the strap. Securing strap end 62 is affixed to body component 12 just below head opening 18 and stitched at a specified angle "A" and a predetermined distance "d" downward therefrom. Securing member 66 is affixed to underside 64 of securing strap 60. Fabric hook elements 68 are formed on securing member 66 to engage fabric loop elements 51 on engaging member 46. Distance "d" and angle "A" enables strap 60 to be able to secure the shoulder strap to safety restraint system 10 in a position away from the head opening. Securing strap 60 also covers securing strap 40 when securing member 66 engages engaging member 46.

Figure 3:
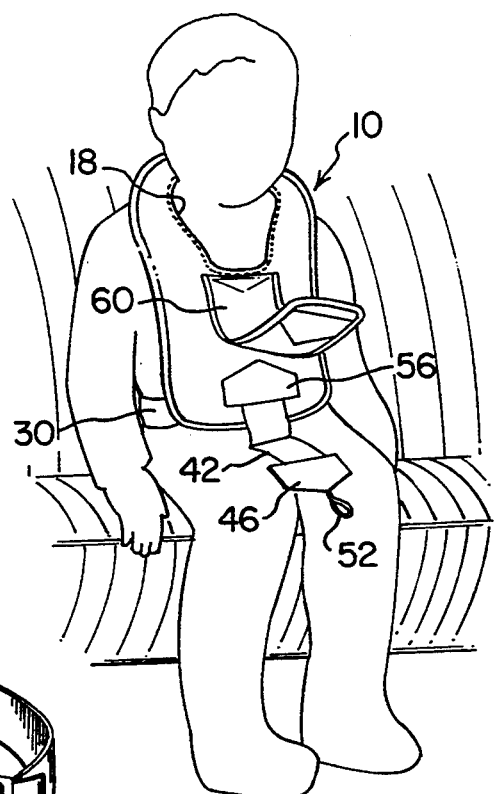
FIG. 3 is a perspective view of the safety restraint device secured onto a child.
Figure 4:
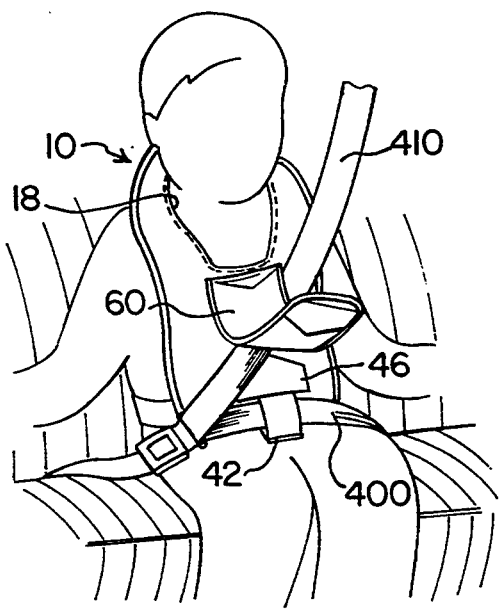
FIG. 4 is a perspective view of the safety restraint device being installed on the child.
Figure 5:
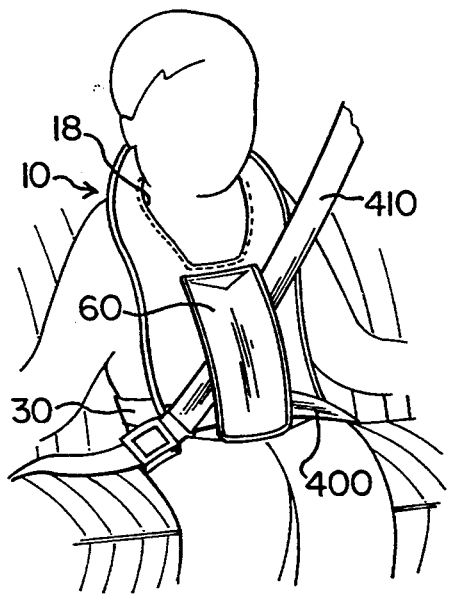
FIG. 5 is a perspective view of the safety restraint device installed on the child.

Safety restraint system 10 is easily used which promotes compliance with small children. There are no awkward or uncomfortable buckles which must be secured while the child is in the seat. In use, as shown in FIGS. 3–5, safety restraint system is simple and comfortable. Safety restraint system 10 is secured onto the child prior to entry into the vehicle. The child simply inserts their head into head opening 18. Belt 30 is wrapped around the child, either by the child or with the assistance of another person. Buckles 36, 38 are engaged to secure safety restraint system 10 to the child. Buckle 36 allows easy adjustability to properly fit the child.

Once the child is seated, the lap belt and shoulder belt can be secured onto safety restraint system 10 by the child or with the assistance of another person. Securing straps 40, 60 are initially disengaged. Lap belt 400, as shown in FIG. 4, is engaged across strap member 42 while shoulder belt 410 is engaged across 12 beneath securing strap 60. Lap belt 400 and shoulder belt 410 can be engaged at this point as directed by the vehicle manufacturer. Strap member 42 is then brought over lap belt 400 and engaging member 46 engages receiving member 54. Once fabric hook elements 50 securely engage fabric hook elements 54, then strap 60 is brought over shoulder strap 410. Strap 60 is firmly pushed against engaging member 46 so that fabric hook elements 68 engage fabric loop elements 51 on engaging member 46.

Once strap 60 securely engages engaging member 46 which is securely engaged to body component 12, the child is securely restrained, as shown in FIG. 5. Shoulder strap 410 is securely held away from the head and neck of the child. This not only provides greater comfort for the child but also provides much greater safety. The child is restrained from leaving the manufacturer-installed restraints until securing straps 40, 60 are released to disengage the safety restraint system 10 from the manufacturer-installed restraints.

Although the use of a shoulder belt is preferred, safety restraint system 10 can also be used with the lap belt only. This allows safety restraint system 10 to be used in older vehicles, airlines, buses and other vehicles not having shoulder belts.

Safety restraint system 10 allows easy and quick release of the child from the manufacturer-installed restraints. Normally all that is required is to raise strap 60 upward until fabric hook elements 68 disengage from fabric loop elements 49. Loop 52 is then pulled downward until fabric hook elements 48 disengage from fabric loop elements 54. Shoulder belt 410 and lap belt 400 can then be released so the child can exit the vehicle. In an emergency, loop 52 can be strongly pulled to release both securing straps 40, 60 simultaneously. This allows quick release from the shoulder and lap belts.

Since the present safety restraint system is comfortable and easy to use, children are less apt to disengage or remove the shoulder strap. Further, these features encourage children to use the safety restraint system without requiring constant attention as to their compliance. A feature that is of particular relevance is the ease of release should an emergency arise, such as in the aftermath of a vehicle accident.

Safety restraint system 10 is able to be folded into a compact bundle for ease of storage and transportation. This is a valuable feature since safety restraint system 10 can be easily stored in a purse or in a child's knapsack. This allows the safety restraint system to be readily available when needed. For instance, small children are often transported to a school or daycare center via a van or car pool. Later, the child may be transported to another center or event by another vehicle. The child may then be transported home in a third vehicle. Since the safety restraint system is readily available, the child can be safely transported, regardless of the vehicle being used.

The present invention is not intended to be limited to the above-described embodiment. Other embodiments are considered to be within the claimed invention. For instance, body component 12 can include adjustments, such as buckles or velcro straps, connecting upper portion 16 and lower portion 14. This allows the size of body component 12 to be adjusted for differing sizes of children.

A second embodiment is shown in FIG. 6. Safety restraint system 600 includes padded shoulder straps 602, 604. Adjustment buckles 606, 608 provide adjustment for differing sizes of children. End portions 610, 612, respectively, are affixed to waistband 614. Fabric hook elements 616 and fabric loop elements 620 are affixed to the free ends of waistband 614 to allow waistband 614 to be secured to a child. Free ends 622, 624 of straps 602, 604 wrap around waistband 614. Fabric hook elements 626, 628 on the free end 622, 624 engage fabric loop elements 630, 632 on shoulder straps 602, 604. Thus, as shown in FIG. 6, shoulder strap 640 and lap belt 650 can be secured by shoulder straps 602, 604 which are secured to the child.

Other embodiments considered within the scope of the present inventive concept include forming the body component in a vest configuration thus eliminating the head opening. Also, a padded life vest configuration can be used under the present invention as an alternate embodiment. Other embodiments and variations are considered with the scope of the inventive concept.

We claim:

1. A safety restraint device for children to secure children in a vehicle seat, said device comprising:
   a body component having a front side;
   means for securing said body component to a child so said front side extends over the chest of the child;
   means for removably securing a lap belt across said front side of said body component; and
   means for removably securing a shoulder belt onto said body component across said front of said body component and in a position away from the head of the child onto which said body component is secured.

2. The safety restraint device of claim 1 wherein said means for securing said body component to a child includes:
   at least one strap secured to opposing sides of said body component and encircling the child.

3. The safety restraint device of claim 1 wherein said means for securing said body component to a child includes:
   a head opening formed in an upper portion of said body component for receiving the head of a child.

4. The safety restraint device of claim 1 wherein said means for securing a shoulder belt includes:
   a first strap;
   a first end portion of said first strap secured to said body component; and
   means for removably securing a second end portion of said first strap over the shoulder belt and relative to said body component to secure the shoulder belt to said body component.

5. The safety restraint device of claim 4 wherein said means for securing a lap belt includes:
   a second strap;
   a first end portion of said second strap secured to said body component; and
   means for removably securing a second end portion of said second strap over the lap belt and relative to said body component to secure the lap belt to said body component.

6. The safety restraint device of claim 1 wherein said means for securing a lap belt includes:
   a strap;
   a first end portion of said strap secured to said body component; and
   means for removably securing a second end portion of said strap over the shoulder strap and relative to said body component to secure the shoulder belt to said body component.

7. The safety restraint device of claim 1 wherein said means for securing a lap belt includes:
   a first strap;
   a first end portion of said first strap secured to said body component;
   first removable securing means on a second end portion of said first strap for securing said first strap over the lap belt and to said body component; and
   said means for securing a shoulder belt includes:
   a second strap;
   a first end portion of said second strap secured to said body component; and
   second removable securing means on a second end portion of said second strap for securing said second strap over the shoulder belt and to said second end portion of said first strap to secure the shoulder belt to said body component.

8. The safety restraint device of claim 7 wherein said first removable securing means include:
   fabric loop means on said body component;
   fabric hook means on a first surface of said second end portion of said first strap for engaging said fabric loop means on said body component; and
   said second removable securing means include:
   fabric loop means on a second surface of said second end portion of said first strap; and
   fabric hook means on said second end portion of said second strap for engaging said fabric loop means on said second surface of said second end portion of said first strap.

9. The safety restraint device of claim 1 wherein said body component includes:
   foam padding in the lower portion of said body component.

10. The safety restraint device of claim 1 wherein said means for removably securing a shoulder belt further includes:
    means for securing a shoulder belt extending from either side of a vehicle across said front side of said body component.

11. A vehicular safety restraint system for use with small children, said safety restraint system comprising:
    a body component having a front side and an upper portion;
    a head opening formed in the upper portion of said body component for receiving the head of a child;
    means for removably securing said body component onto a child so said front side extends over the chest of the child;
    means for removably securing a shoulder safety belt to said front side of said body component and away from said head opening; and
    means for removably securing a lap belt to said body component.

12. The safety restraint system of claim 11 wherein said means for removably securing a shoulder belt includes:
    a first strap;
    a first end portion of said first strap secured to said body component; and
    means for removably securing a second end portion of said first strap over the shoulder strap and relative to said body component to secure the shoulder belt to said body component.

13. The safety restraint system of claim 12 wherein said means for removably securing a lap belt includes:
    a second strap;
    a first end portion of said second strap secured to said body component; and
    means on a second end portion of said second strap for removably securing said second strap over the lap belt and to said body component.

14. The safety restraint system of claim 13 wherein said means for removably securing a lap belt further includes:
    means on said second end portion of said second strap for securing said second end portion of said first strap to said body component.

15. The safety restraint system of claim 11 wherein said means for removably securing a lap belt includes:
    a strap;
    a first end portion of said strap secured to said body component; and means on a second end portion of said strap for removably securing said strap over the lap belt and to said body component.

16. The safety restraint system of claim 11 wherein said body component includes:
   a lower portion; and
   padding in said lower portion.

17. The safety restraint device of claim 11 wherein said means for removably securing a shoulder safety belt to said body component further includes:
   means for securing the shoulder belt extending from either side of a vehicle across said front side of said body component.

18. A method for providing safety restraint for small children riding in vehicles, said method comprising the steps of:
   providing a safety restraint device having a front side and a head opening for a child;
   providing means for securing a vehicle shoulder belt on said safety restraint device across said front side and away from said head opening; and
   providing means for securing a vehicle lap belt on said front side of said safety restraint device.

19. The method of claim 18 wherein said step of providing means for securing a vehicle shoulder belt on said safety restraint device across said front side and away from said head opening includes:
   providing a strap secured on said safety restraint device to engage over the vehicle shoulder belt and removably secured to said safety restraint device.

20. The method of claim 18 wherein said step of providing means for securing a vehicle lap belt on said front side of said safety restraint device includes the steps of:
   providing a strap secured on said safety restraint device to engage over the vehicle lap belt and removably secured to said safety restraint device.

21. The method of claim 18 wherein said steps of providing means for securing a vehicle shoulder belt and a vehicle lap belt on said safety restraint device includes:
   providing a first strap secured on said safety restraint device to engage over the vehicle lap belt and removably secured to said safety restraint device; and
   providing a second strap secured on said safety restraint device to engage over the vehicle shoulder belt and removably secured to said first strap.

* * * * *